United States Patent
Morris

(10) Patent No.: US 7,242,920 B2
(45) Date of Patent: Jul. 10, 2007

(54) METHODS, SYSTEMS, AND COMPUTER PROGRAM PRODUCTS FOR CONTROLLING DATA TRANSMISSION BASED ON POWER COST

(75) Inventor: Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 28 days.

(21) Appl. No.: 10/908,889

(22) Filed: May 31, 2005

(65) Prior Publication Data

US 2006/0270385 A1    Nov. 30, 2006

(51) Int. Cl.
H04M 11/00  (2006.01)
H04B 17/00  (2006.01)
H04B 7/00   (2006.01)
H04Q 7/20   (2006.01)

(52) U.S. Cl. .................. 455/405; 455/67.11; 455/522; 455/452.2

(58) Field of Classification Search ............. 455/405, 455/67.11, 522, 452.2
See application file for complete search history.

(56) References Cited

U.S. PATENT DOCUMENTS

| | | | |
|---|---|---|---|
| 5,140,589 A | | 8/1992 | Otsuka |
| 5,157,709 A | * | 10/1992 | Ohteru ........................ 455/465 |
| 5,203,008 A | * | 4/1993 | Yasuda et al. ............ 455/452.2 |
| 5,539,925 A | | 7/1996 | Yli-Kotila et al. |
| 5,666,651 A | * | 9/1997 | Wang ......................... 455/512 |
| 5,680,441 A | * | 10/1997 | Gallo ......................... 455/74.1 |
| 5,893,037 A | | 4/1999 | Reele et al. |
| 5,940,769 A | * | 8/1999 | Nakajima et al. ........... 455/509 |
| 5,946,356 A | * | 8/1999 | Felix et al. ................. 375/295 |
| 5,974,093 A | * | 10/1999 | Lee ............................ 375/297 |
| 5,974,327 A | * | 10/1999 | Agrawal et al. .......... 455/452.2 |
| 6,047,189 A | * | 4/2000 | Yun et al. ................. 455/452.2 |
| 6,052,594 A | * | 4/2000 | Chuang et al. ............. 455/450 |
| 6,088,335 A | * | 7/2000 | I et al. ........................ 370/252 |
| 6,097,965 A | * | 8/2000 | Honkasalo et al. ....... 455/452.2 |
| 6,119,011 A | * | 9/2000 | Borst et al. .............. 455/452.2 |
| 6,192,257 B1 | | 2/2001 | Ray |
| 6,275,712 B1 | * | 8/2001 | Gray et al. ................. 455/522 |
| 6,317,609 B1 | | 11/2001 | Alperovich et al. |
| 6,337,987 B1 | | 1/2002 | Agin et al. |
| 6,337,988 B1 | | 1/2002 | Agin et al. |
| 6,337,989 B1 | | 1/2002 | Agin et al. |
| 6,542,728 B1 | * | 4/2003 | Kaku .......................... 455/406 |
| 6,748,235 B1 | | 6/2004 | Shin et al. |

(Continued)

OTHER PUBLICATIONS

ElBatt, T. A., et al., "Power Management for Throughput Enhancement in Wireless Ad-Hoc Networks," IEEE ICC, Jun. 2000, 9 pages.

(Continued)

Primary Examiner—Nick Corsaro
Assistant Examiner—Christopher M. Brandt

(57) ABSTRACT

Methods, systems, and computer program products are disclosed for controlling data transmission based on power cost. A power cost per unit data associated with successfully sending data from a wireless mobile device to a remote endpoint in a communications network is determined. The determined power cost per unit data is compared to a first threshold. Transmission of data from the wireless mobile device to the remote endpoint is delayed based on a determination that the power cost per unit data exceeds the first threshold.

34 Claims, 8 Drawing Sheets

U.S. PATENT DOCUMENTS

| | | |
|---|---|---|
| 7,164,919 B2 * | 1/2007 | Chen ................... 455/452.2 |
| 2001/0014612 A1 | 8/2001 | Uesugi |
| 2002/0022495 A1 | 2/2002 | Choi et al. |
| 2002/0102938 A1 | 8/2002 | Tsubaki et al. |
| 2003/0003875 A1 | 1/2003 | Oestreich |
| 2003/0064744 A1 | 4/2003 | Zhang et al. |
| 2004/0087327 A1 | 5/2004 | Guo |
| 2004/0116161 A1 | 6/2004 | Grivas et al. |
| 2004/0185918 A1 | 9/2004 | Fan et al. |
| 2004/0198467 A1 | 10/2004 | Orlik et al. |
| 2004/0204183 A1 | 10/2004 | Lencevicius et al. |
| 2004/0214593 A1 | 10/2004 | Shin et al. |
| 2004/0228293 A1 | 11/2004 | Choi et al. |
| 2004/0229622 A1 | 11/2004 | Choi et al. |
| 2004/0253955 A1 * | 12/2004 | Love et al. ............ 455/442 |
| 2004/0253962 A1 * | 12/2004 | Ganti et al. ........... 455/452.1 |
| 2004/0259542 A1 | 12/2004 | Vitamaki et al. |
| 2004/0264396 A1 | 12/2004 | Ginzburg et al. |
| 2004/0266493 A1 * | 12/2004 | Bahl et al. ............ 455/574 |
| 2005/0032541 A1 | 2/2005 | Wang et al. |
| 2005/0070339 A1 | 3/2005 | Kim |
| 2005/0096102 A1 | 5/2005 | Mock et al. |
| 2005/0261038 A1 * | 11/2005 | Chary ................... 455/574 |
| 2006/0270415 A1 * | 11/2006 | Waxman ............... 455/452.2 |

OTHER PUBLICATIONS

Raghunathan, V., et al., "Energy-Aware Wireless Microsensor Networks," IEEE Signal Processing Magazine 1053-5888, Mar. 2002, pp. 40-50.

* cited by examiner

METHODS, SYSTEMS, AND COMPUTER PROGRAM PRODUCTS FOR CONTROLLING DATA TRANSMISSION BASED ON POWER COST

TECHNICAL FIELD

The subject matter described herein relates to reducing power consumption of a device. More particularly, the subject matter described herein relates to controlling data transmission based on power cost.

BACKGROUND

Reducing power consumption in wireless mobile devices is of growing concern. Wireless mobile devices today include an ever-growing list of features, such as Web browsing, e-mail, text messaging, and digital photography, to name a few. Manufacturers strive to pack these additional features into a small package, thus leaving less and less room for batteries. At the same time, these additional features can significantly increase power consumption of a wireless mobile device. For example, power is consumed by the wireless mobile device's transmitter whenever data is transmitted, such as when an e-mail, digital photograph, or text message is sent or when data is uploaded to a web site.

Moreover, the amount of power consumed will vary based on characteristics of the data transmission. That is, the same amount of data can be transmitted multiple times to a remote endpoint under varying circumstances, with each time resulting in a different amount of power being consumed in connection with the data transmission, which is referred to herein as a power cost. It would be advantageous to control data transmission based on power cost to provide reduced power consumption.

Accordingly, there exists a need for methods, systems, and computer program products for controlling data transmission based on power cost.

SUMMARY

In one aspect of the subject matter disclosed herein, a method is disclosed for controlling data transmission based on power cost. The method includes determining a power cost per unit data associated with successfully sending data from a wireless mobile device to a remote endpoint in a communications network and comparing the power cost per unit data to a first threshold. Transmission of data from the wireless mobile device to the remote endpoint is delayed based on a determination that the power cost per unit data exceeds the first threshold.

In another aspect of the subject matter disclosed herein, a method is disclosed for controlling data transmission based on power cost. The method includes determining a power cost per unit data associated with successfully sending data from a wireless mobile device to a remote endpoint in a communications network and comparing the power cost per unit data to a first threshold. A remaining battery capacity for the wireless mobile device is determined. Transmission of data from the wireless mobile device to the remote endpoint is delayed based on a determination that the power cost per unit data exceeds the first threshold and the remaining battery capacity.

In another aspect of the subject matter disclosed herein, a system is disclosed for controlling data transmission based on power cost. The system includes means for determining a power cost per unit data associated with successfully sending data from a wireless mobile device to a remote endpoint in a communications network, means for comparing the power cost per unit data to a first threshold, and means for delaying transmission of data from the wireless mobile device to the remote endpoint based on a determination that the power cost per unit data exceeds the first threshold.

In another aspect of the subject matter disclosed herein, a system for controlling data transmission based on power cost includes a power cost monitor that determines a power cost per unit data associated with successfully sending data from a wireless mobile device to a remote endpoint in a communications network and for comparing the power cost per unit data to a first threshold. The system also includes a transmitter controller that delays transmission of data from the wireless mobile device to the remote endpoint based on a determination that the power cost per unit data exceeds the first threshold.

In another aspect of the subject matter disclosed herein, a system for controlling data transmission based on power cost includes a power cost monitor that determines a power cost per unit data associated with successfully sending data from a wireless mobile device to a remote endpoint in a communications network, that compares the power cost per unit data to a first threshold, and that determines a remaining battery capacity for the wireless mobile device. The system also includes a transmitter controller that delays transmission of data from the wireless mobile device to the remote endpoint based on a determination that the power cost per unit data exceeds the first threshold and the remaining battery capacity.

In another aspect of the subject matter disclosed herein, a computer program product is disclosed. The computer program product includes computer executable instructions embodied in a computer-readable medium. The computer executable instructions are for performing steps including determining a power cost per unit data associated with successfully sending data from a wireless mobile device to a remote endpoint in a communications network, comparing the power cost per unit data to a first threshold, and delaying transmission of data from the wireless mobile device to the remote endpoint based on a determination that the power cost per unit data exceeds the first threshold.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Thus, the subject matter described herein can be embodied in many different forms, and all such forms are contemplated to be within the scope of what is claimed.

According to the subject matter described herein, power consumption is reduced by delaying data transmissions until the power cost per unit data is below a threshold value. For example, if a mobile phone user sends an e-mail to an e-mail recipient, the transmission of the e-mail may be delayed until a favorable power costs per unit data exists, as described further below. Consequently, power consumption is reduced in comparison to sending the e-mail without considering power cost.

Figure 1:
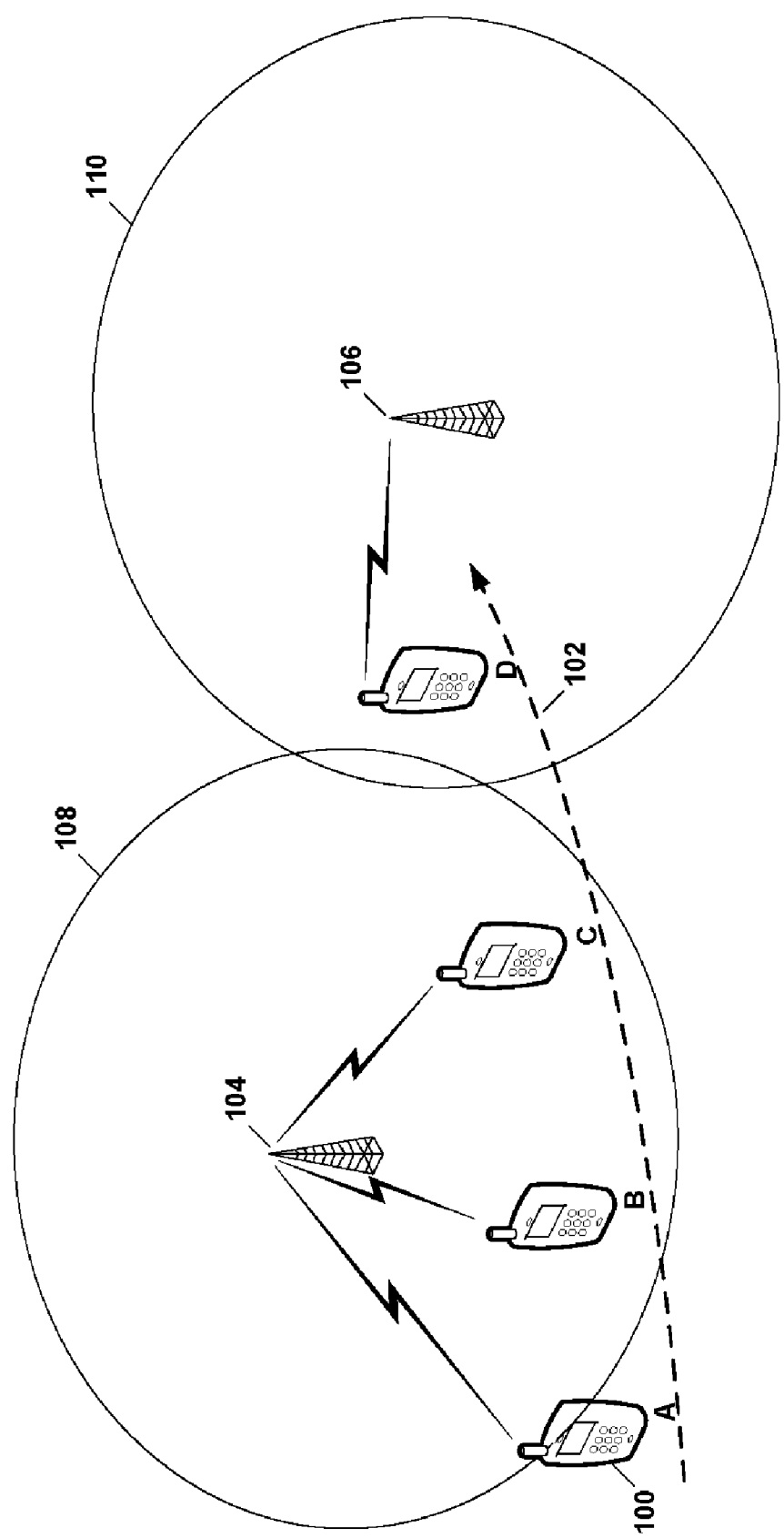
FIG. 1 is a schematic diagram illustrating a communication scenario in which the subject matter described herein may be applied.

FIG. 1 is a schematic diagram illustrating a communication scenario in which the subject matter described herein may be applied. In FIG. 1, a wireless mobile device 100 is being moved along a path 102. For example, wireless mobile device 100 may be a mobile phone, a laptop computer, a personal digital assistant (PDA), or another like device in a moving automobile. Wireless mobile device 100 moves through four positions, namely A, B, C, and D, along path 102. Two base stations 104 and 106 serve areas 108 and 110, respectively. As shown in FIG. 1, wireless mobile device 100 moves through area 108 while communicating with base station 104 at positions A, B, and C, and into area 110 to communicate with base station 106 at positioned D.

Figure 2:
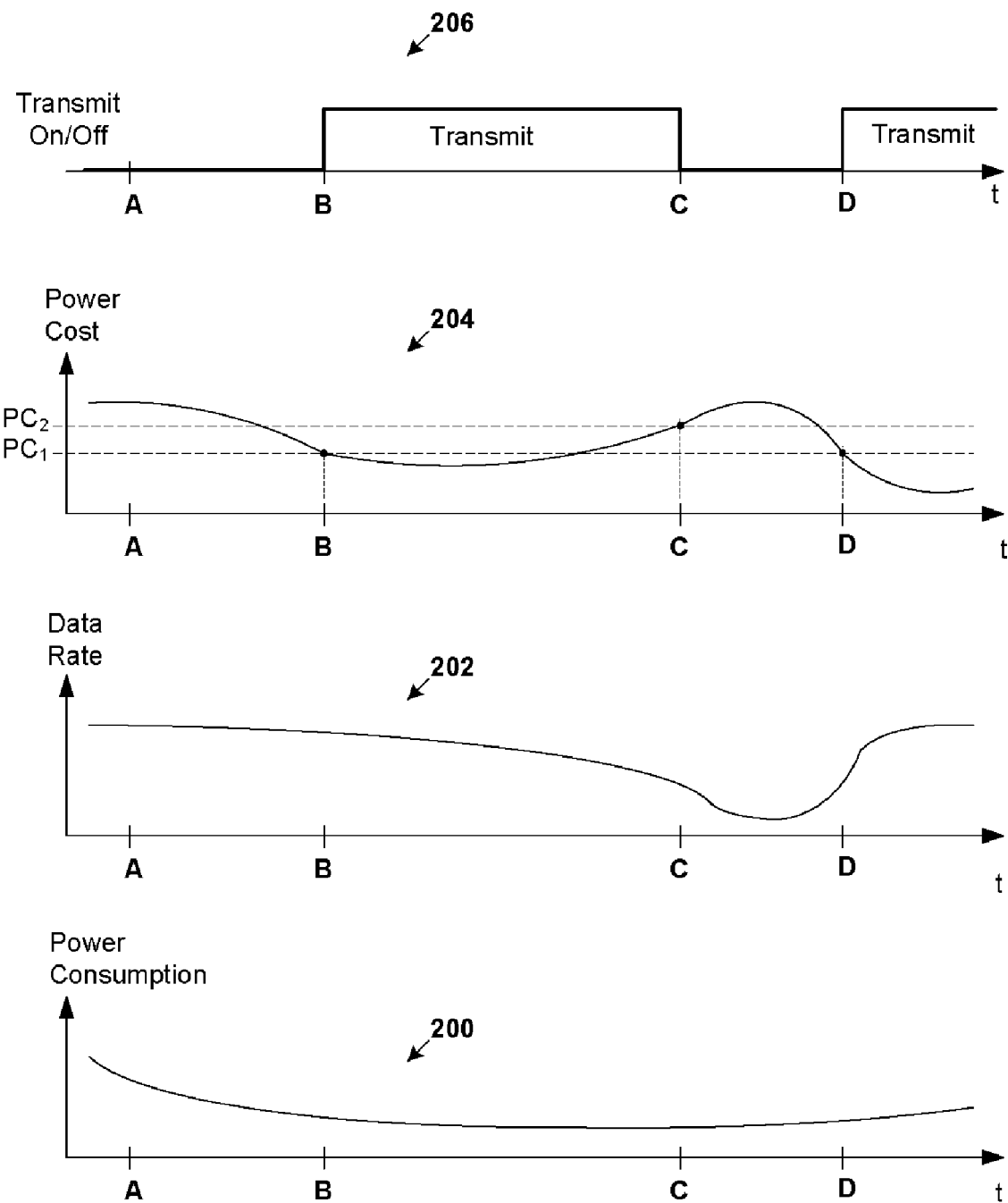
FIG. 2 includes graphical representations illustrating power consumption, data rate, power cost, and data transmission of a wireless mobile device according to an aspect of the subject matter disclosed herein.

FIG. 2 includes graphical representations illustrating power consumption, data rate, power cost, and data transmission of wireless mobile device 100 at times A, B, C, and D corresponding to positions A, B, C, and D of FIG. 1 according to an aspect of the subject matter disclosed herein. In FIG. 2, a power consumption graph 200 represents a power consumption rate associated with data transmission in wireless mobile device 100 as a function of time. The power consumption rate is a measure of power consumed in connection with the transmission of data from wireless mobile device 100. The power consumption rate may be measured in wireless mobile device 100 by measuring a power consumption rate associated with the transmission of data by a transmitter of wireless mobile device 100. Here, the measured power consumption rate can include power consumption resulting from any unsuccessful data transmissions, e.g., data not reaching a receiver due to dropped packets, network congestion, collisions, and other causes.

Alternatively, or in addition, power consumption rate may be determined by determining a received signal strength indicator (RSSI). RSSI is a measure of signal strength of a data transmission at a receiver receiving the data transmission. RSSI is commonly used in closed loop power control (also referred to as feedback power control) to set a signal strength for a transmitted signal based on the signal strength as seen by the receiver. The receiver provides an RSSI value to the transmitter that the transmitter compares to a reference value to determine whether to adjust power up or down. This cycle continues to maintain relatively constant signal strength at the receiver. Closed loop power control compensates for path loss experienced in the transmission medium by increasing power when too low and prevents interference with other signals due to excessive signal strength by decreasing power when too high.

A data rate graph 202 represents a data transmission rate for data transmitted by wireless mobile device 100 as a function of time. The data transmission rate may be associated with the rate of data successfully sent from a transmitter in wireless mobile device 100 to a receiver. The data transmission rate may be determined by considering data throughput, bit error rate (BER), a number of retries, a number of collisions, a number of dropped packets, and other such data rate variables known in the art. For example, if 1 Mb of data is transmitted by a transmitter of wireless mobile device 100 during a 1 s time period and only 500 Kb of data are received at the receiver due to dropped packets or other transmission errors, the data transmission rate for the given time period may be considered to be 500 Kb/s. The data transmission rate may be determined in whole or in part by feedback received from the receiver.

A power cost graph 204 represents a power cost per unit data associated with sending data from a wireless mobile device 100 as a function of time. The power cost per unit data may be determined by dividing the power consumption rate by the data rate. An exemplary power cost per unit data value may be $(1.0 \text{ mW/s})/(500 \text{ Kb/s})=2.0\times10^{-9}$ W/Kb. As will be appreciated, power cost per unit data may be determined using other calculations that may include weighting factors and/or other known parameters. Power cost graph 204 includes two power cost thresholds, $PC_1$ and $PC_2$. $PC_1$ represents a maximum power cost per unit data value below which data transmission is started. $PC_2$ is an optional second power cost threshold that represents a maximum power cost per unit data above which ongoing data transmission is halted. As will be appreciated, $PC_2$ may be set equal to $PC_1$ and/or additional thresholds may be employed.

Finally, a transmit on/off graph 206 illustrates periods during which data is transmitted (or is not transmitted) by wireless mobile device 100 as a function of time.

With reference to FIGS. 1 and 2, when wireless mobile device 100 is at position A, the data rate 202 is favorable but the power consumption is relatively high (due, for example, to the distance from base station 104), which results in a power cost that is above $PC_1$. Consequently, the power cost is too high and no data is transmitted. When wireless mobile device 100 is at position B, the data rate 202 is favorable and the power consumption is reduced (due, for example, to the reduced distance from base station 104). This results in a power cost reduction such that the power cost per unit data is below $PC_1$. Consequently, data transmission is initiated at time B (which corresponds to wireless mobile device 100 being at position B). At position C, power consumption remains relatively low but the data rate drops due to an increase in transmission error rate. The increase in transmission error rate may result, for example, from network congestion, dropped packets, collisions, and other error-causing conditions. Consequently, power cost increases above $PC_2$ and data transmission is stopped. At position D, power consumption remains relatively low and the data rate increases due to the availability of base station 106. Consequently, power cost again decreases below $PC_1$ and data transmission is restarted.

Figure 3:
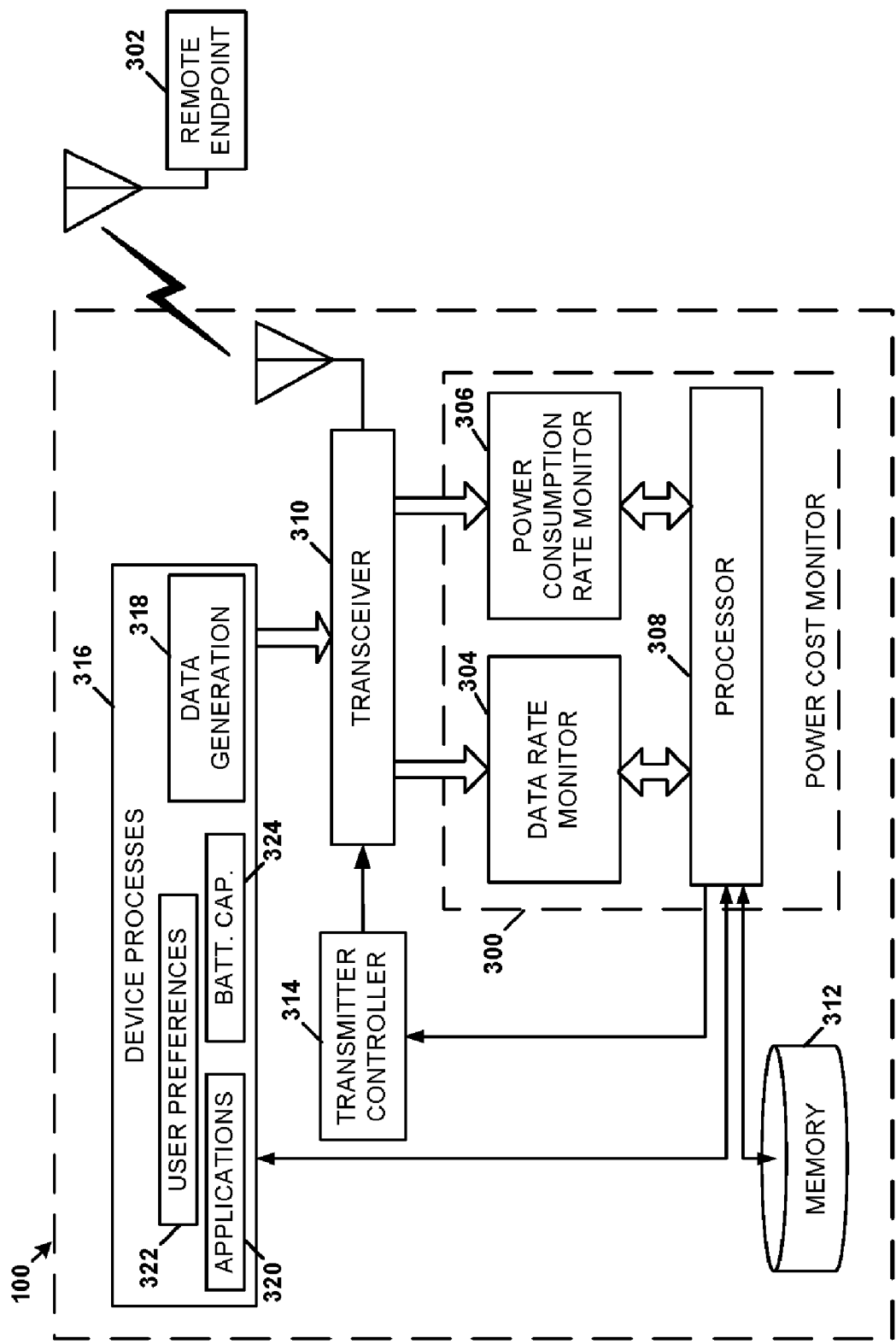
FIG. 3 is a block diagram illustrating a wireless mobile device with a system for controlling data transmission based on power cost according to an aspect of the subject matter disclosed herein.

FIG. 3 is a block diagram illustrating wireless mobile device 100 with a system for controlling data transmission based on power cost according to an aspect of the subject matter disclosed herein. In FIG. 3, wireless mobile device 100 includes means for determining a power cost per unit data associated with successfully sending data from a wireless mobile device to a remote endpoint in a communications network. For example, wireless mobile device 100 may include a power cost monitor 300 that determines a power cost per unit data associated with successfully sending data from wireless mobile device 100 to a remote endpoint 302 in a communications network. Remote endpoint 302 may be a base station, wireless access point, or any other wireless network entity known in the art.

Power cost monitor 300 includes a data rate monitor 304, a power consumption rate monitor 306, and a processor 308. Data rate monitor 304 determines a data transmission rate associated with successfully sending data from a transceiver 310 of wireless mobile device 100 to remote endpoint 302. For example, data rate monitor 304 may be configured to determine a data transmission rate associated with successfully sending data from transceiver 310 to remote endpoint 302 by determining data throughput, BER, a number of retries, a number of dropped packets, and/or a number of collisions. This information may be determined in whole or in part by feedback from remote endpoint 302 received via transceiver 310.

Power consumption rate monitor 306 determines a power consumption rate associated with data transmission. Here, the power consumption rate determination may take any unsuccessful data transmissions into account, as discussed above. In one aspect, power consumption rate monitor 306 is configured to determine a power consumption rate associated with data transmission by determining RSSI. RSSI feedback is received from remote endpoint 302 via transceiver 310. In another aspect, power consumption rate monitor 306 is configured to determine a power consumption rate associated with data transmission by measuring a power consumption rate of a transmitter and any other components associated with the data transmission. Here, the measured power consumption rate may include power consumption resulting from any unsuccessful data transmissions. In yet another aspect, the power consumption rate is determined by a combination of both techniques.

Processor 308 determines the power cost per unit data based on the determined data transmission rate and determined power consumption rate received from data rate monitor 304 and power consumption rate monitor 306, respectively. For example, processor 308 may determine the power cost per unit data by dividing the power consumption rate by the data transmission rate, as discussed above, or using another calculation/algorithm.

Wireless mobile device 100 also includes means for comparing the power cost per unit data to one or more thresholds. For example, processor 308 can compare the power cost per unit data to one or more thresholds. The threshold can be static or can change dynamically. In one implementation, wireless mobile device 100 includes a memory 312 for storing one or more threshold values and processor 308 compares the power cost per unit data to a threshold by retrieving the threshold from memory 312 and comparing the power cost per unit data to the retrieved threshold. For example, processor 308 may retrieve a threshold from memory 312 by performing a lookup in a lookup table stored in memory 312.

Wireless mobile device 100 also includes means for delaying transmission of data from the wireless mobile device to the remote endpoint based on a determination that the power cost per unit data exceeds a threshold. For example, a transmitter controller 314 can delay transmission of data from the wireless mobile device 100 to the remote endpoint 302 based on a determination to processor 308 that the power cost per unit data exceeds the threshold. Here, the transmitter controller may be configured to delay transmission of only non-real-time data. As used herein, non-real-time data refers to data that does not need to be transmitted in real-time or near-real-time in order to be usable for its primary purpose. For example, e-mails, stored digital images, and text messages may be considered non-real-time data since a time of delivery is not critical. On the other hand, voice data in a telephone conversation may be considered real-time or near-real-time data since a time of delivery is more important.

Transmitter controller 314 may delay transmission of data by transceiver 310 by delaying a start time for data transmission. In addition, transmitter controller 314 may delay transmission of data by transceiver 310 by pausing or stopping data transmission and restarting data transmission at a later time. As discussed above, transmitter controller 314 may start and restart data transmission based on the same threshold value or based on two different threshold values. Using different threshold values provides the advantage of preventing transceiver 310 from cycling on and off rapidly in a case where the power cost per unit data value is rapidly moving above and below a single threshold.

According to another aspect, more than two threshold values may alternatively be employed with each threshold corresponding to a duty cycle for data transmissions by transceiver 310. For example, two or more power cost thresholds may be employed with each power cost threshold corresponding to a duty cycle for turning on and off data transmissions by transceiver 310. The corresponding duty cycle can decrease (less transmitter-on time) as the power cost thresholds increase. As the power cost per unit data exceeds each power cost threshold, the corresponding duty cycle is used for data transmission by transceiver 310. Alternatively, the duty cycle corresponding to the nearest power cost thresholds may be used.

According to another aspect, one or more data transmission policies may be stored in memory 312 and retrieved and applied by processor 308 based on current conditions. For example, processor 308 may determine a data transmission policy based on one or more data transmission-related characteristics, such as a type of data being transmitted, a priority associated with the type of data being transmitted, a priority assigned to data transmission by a user, a communication network type, a type of transmission, a data size being transmitted, a type of application requesting the transmission, a destination of the data transmission, a time of day, a location of the wireless mobile device, previous data transmissions, and remaining battery capacity. In one implementation, the one or more transmission-related characteristics may be used to select a corresponding data transmission policy from a table stored in memory 312. The data transmission policy may then be used to determine a power cost threshold value. In addition, processor 308 may be configured to dynamically update the threshold as different data transmission policies are applied.

Wireless mobile device 100 also includes other device processes 316 associated with the operation of wireless mobile device 100. For example, wireless mobile device 100 includes data generation components that generate data from various sources, applications 320, a user preference monitor 322 for determining user preferences that may be input via a user interface, and a battery capacity monitor 324 that monitors a battery level. It will be understood that wireless mobile device 100 may include many other device processes 316 known in the art.

It should also be understood that device processes 316, transceiver 310, memory 312, and remote endpoint 302 are not necessarily components of the system for controlling data transmission based on power cost, but may be optionally employed as needed. In addition, it should be understood that the various components illustrated in FIG. 3 represent logical components that are configured to perform the functionality described herein and may be implemented in software, hardware, or a combination of the two. Moreover, some or all of these logical components may be combined or may be omitted altogether while still achieving the functionality described herein.

As discussed above, the data transmission policy may be selected based on one or more data transmission-related characteristics. Some or all of the data transmission-related characteristics may be determined by monitoring device processes 316. For example, the type of data being transmitted, a type of transmission, a data size being transmitted, a type of application requesting the transmission, a destination of the data transmission, a time of day, a location of the wireless mobile device, previous data transmissions, and a priority associated with the type of data being transmitted may be determined by monitoring applications 320. In one example, an e-mail being sent to a spouse may be given higher priority and thus a higher power cost threshold then an e-mail sent to someone else, as can be dictated by the corresponding data transmission policy. E-mails, in general, may be assigned to one data transmission policy while text messages and photographs are assigned to another.

The priority assigned to data transmission by a user may be determined by monitoring user preference monitor 322. User preference monitor may include a keyboard (or keypad), display, and appropriate user interface. Remaining battery capacity can be determined by monitoring battery capacity monitor 324.

According to another aspect, processor 308 determines a remaining battery capacity for the wireless mobile device 100 from battery capacity monitor 324. Transmitter controller 314 delays transmission of data based on both a determination that the power cost per unit data exceeds the threshold and the remaining battery capacity. In this case, the threshold may be static but may only be applied to control data transmission when the battery capacity is below a power save threshold value. For example, power cost considerations may only come into play when battery levels drop below 25%.

Figure 4:
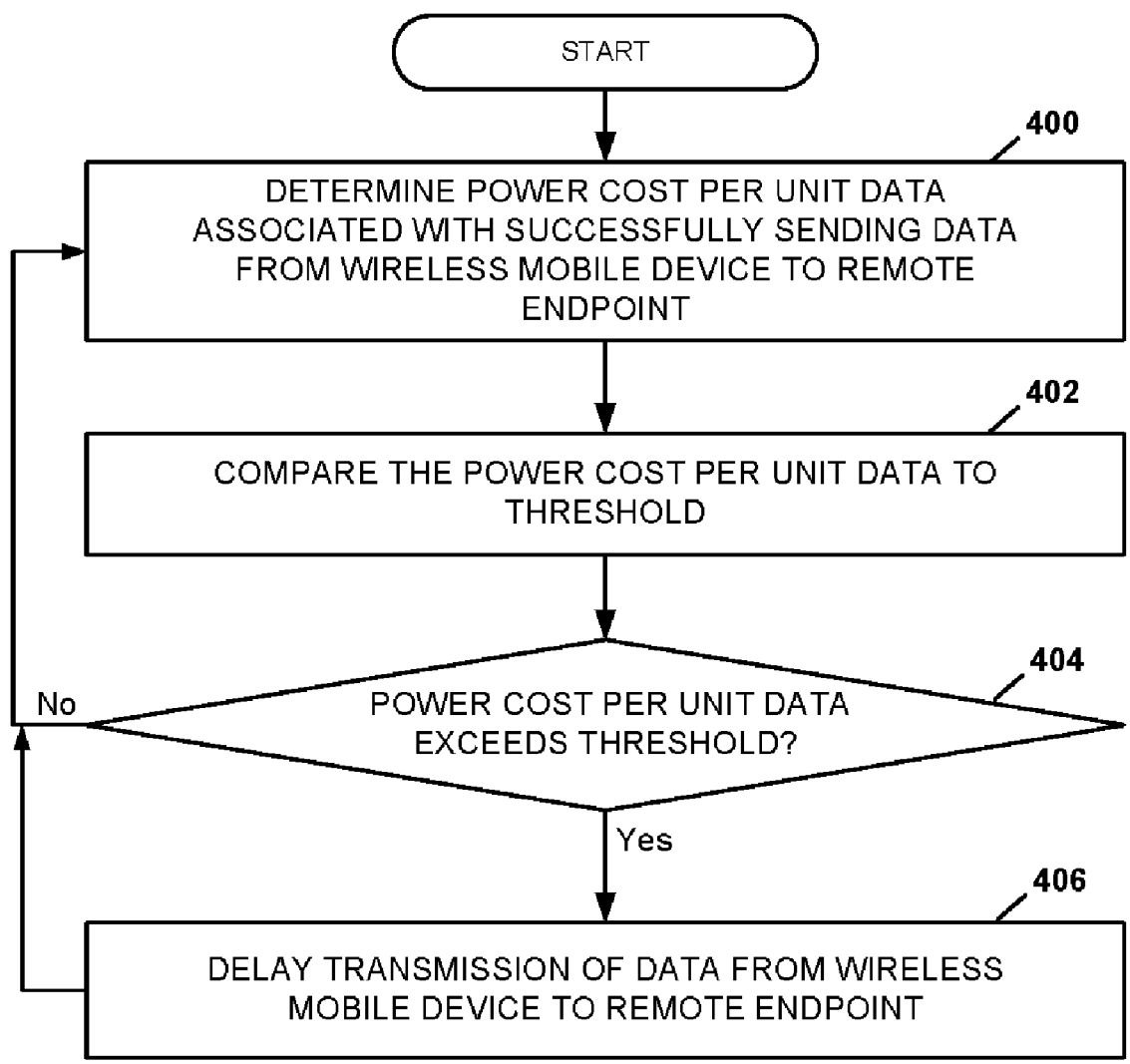
FIG. 4 is a flow diagram illustrating a method for controlling data transmission based on power cost according to an aspect of the subject matter disclosed herein.

FIG. 4 is a flow diagram illustrating a method for controlling data transmission based on power cost according to an aspect of the subject matter disclosed herein. In block 400, a power cost per unit data associated with successfully sending data from wireless mobile device 100 to remote endpoint 302 is determined by power cost monitor 300. The power cost per unit data is compared to a threshold by processor 308 in block 402. Processor 308 determines whether the power cost per unit data exceeds the threshold in block 404. In block 406, transmitter controller 314 delays transmission of data to remote endpoint 302 based on processor 308 determining that the power cost per unit data exceeds the threshold in block 404. When processor 308 determines that the power cost per unit data does not exceed the threshold in block 404, control returns to block 400.

Figure 5:
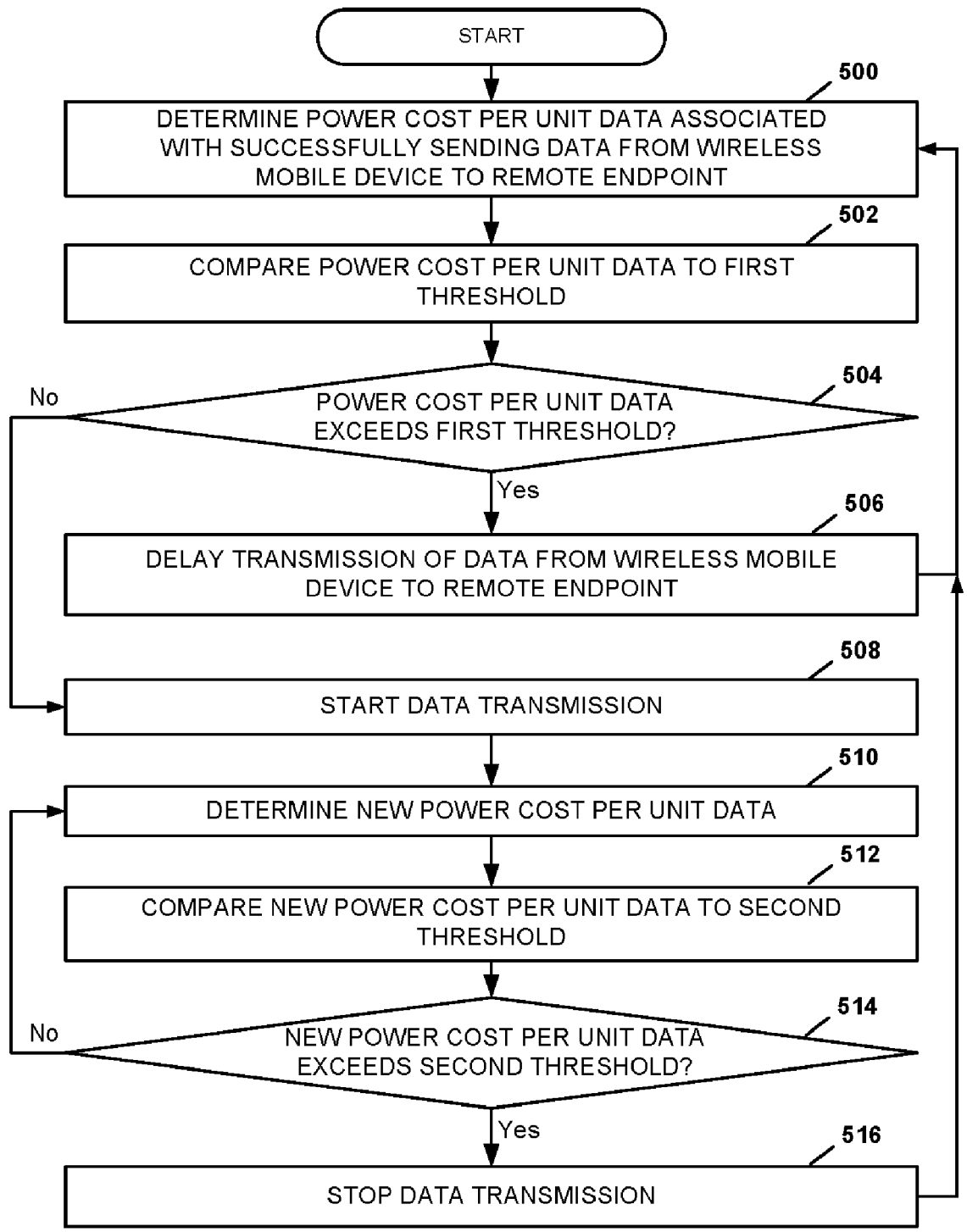
FIG. 5 is a flow diagram illustrating a method for controlling data transmission based on power cost according to another aspect of the subject matter disclosed herein.

FIG. 5 is a flow diagram illustrating a method for controlling data transmission based on power cost according to another aspect of the subject matter disclosed herein. In block 500, a power cost per unit data associated with successfully sending data from wireless mobile device 100 to remote endpoint 302 is determined by power cost monitor 300. The power cost per unit data is compared to a first threshold by processor 308 in block 502. Processor 308 determines whether the power cost per unit data exceeds the first threshold in block 504. In block 506, transmitter controller 314 delays transmission of data to remote endpoint 302 based on processor 308 determining that the power cost per unit data exceeds the first threshold in block 504. In response to processor 308 determining that the power cost per unit data does not exceed the first threshold in block 504, data transmission is started in block 508. A new power cost per unit data is determined by power cost monitor 300 in block 510. The new power cost per unit data is compared to a second threshold by processor 308 in block 512. Processor 308 determines whether the new power cost per unit data exceeds the second threshold in block 514. In block 516, transmitter controller 314 stops transmission of data to remote endpoint 302 based on processor 308 determining that the new power cost per unit data exceeds the second threshold in block 514. In response to processor 308 determining that the new power cost per unit data does not exceed the first threshold in block 514, control returns to block 510.

Figure 6:
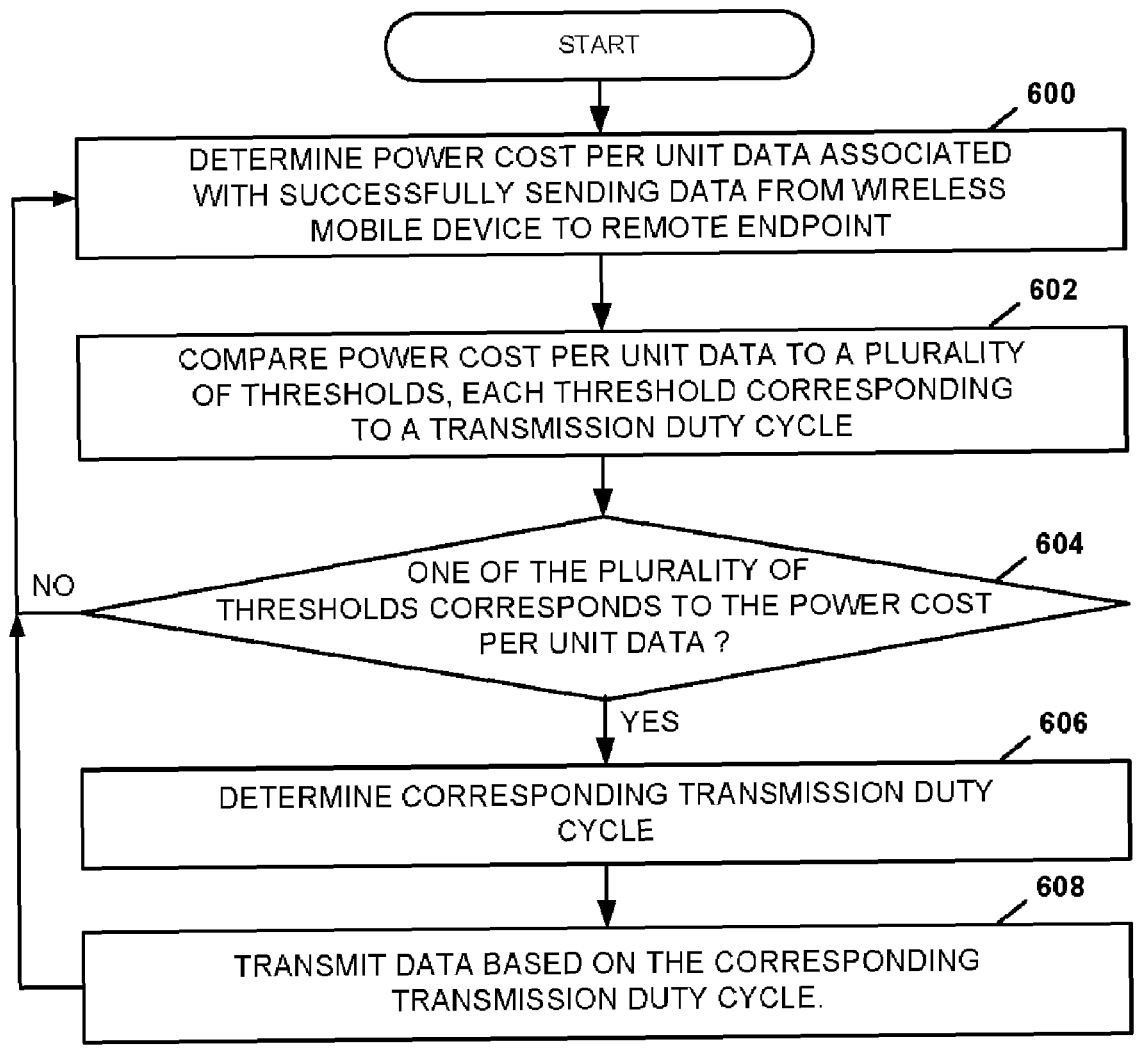
FIG. 6 is a flow diagram illustrating a method for controlling data transmission based on power cost according to another aspect of the subject matter disclosed herein.

FIG. 6 is a flow diagram illustrating a method for controlling data transmission based on power cost according to another aspect of the subject matter disclosed herein. In block 600, a power cost per unit data associated with successfully sending data from wireless mobile device 100 to remote endpoint 302 is determined by power cost monitor 300. The power cost per unit data is compared to a plurality of thresholds by processor 308 in block 602. Processor 308 determines whether the power cost per unit data corresponds to one of the plurality of thresholds in block 604. For example, the power cost per unit data may correspond to the highest threshold that it exceeds. Alternatively, the power cost per unit data may correspond to the nearest threshold. In block 606, processor 308 determines a transmission duty cycle corresponding to the threshold based on processor 308 determining that the power cost per unit data corresponds to one of the plurality of thresholds in block 604. Data is transmitted based on the corresponding transmission duty cycle in block 608. When processor 308 determines that the power cost per unit data does not correspond to one of the plurality of thresholds in block 604, control returns to block 600.

Figure 7:
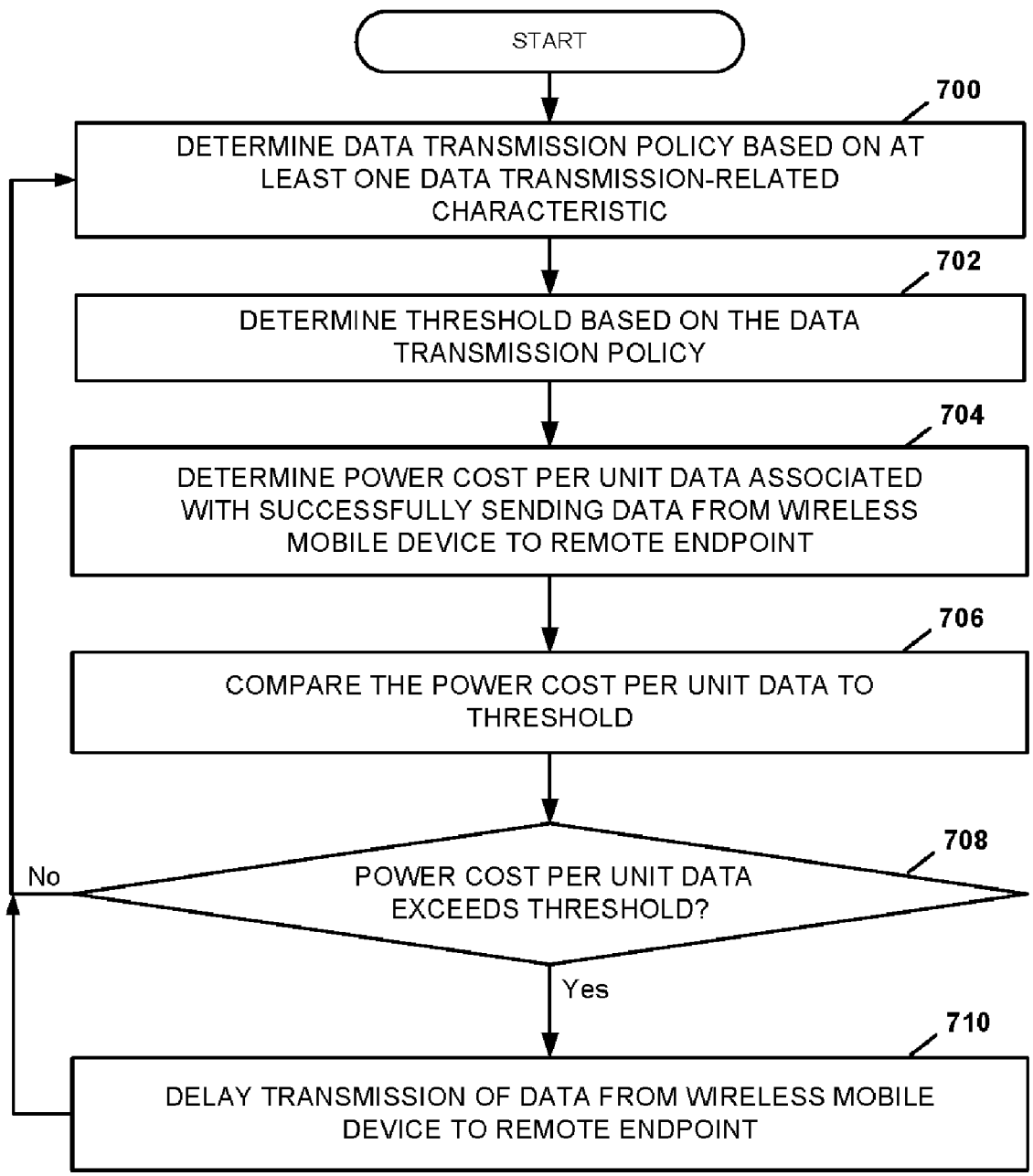
FIG. 7 is a flow diagram illustrating a method for controlling data transmission based on power cost according to another aspect of the subject matter disclosed herein.

FIG. 7 is a flow diagram illustrating a method for controlling data transmission based on power cost according to another aspect of the subject matter disclosed herein. In block 700, a data transmission policy is determined by processor 308 based on at least one data transmission-related characteristic. A threshold is determined based on the data transmission policy by processor 308 in block 702. Power cost per unit data associated with successfully sending data from wireless mobile device 100 to remote endpoint 302 is determined by power cost monitor 300 in block 704. The power cost per unit data is compared to the threshold by processor 308 in block 706. Processor 308 determines whether the power cost per unit data exceeds the threshold in block 708. In block 710, transmitter controller 314 delays transmission of data to remote endpoint 302 based on processor 308 determining that the power cost per unit data exceeds the threshold in block 708. When processor 308 determines that the power cost per unit data does not exceed the threshold in block 700, control returns to block 700.

Figure 8:
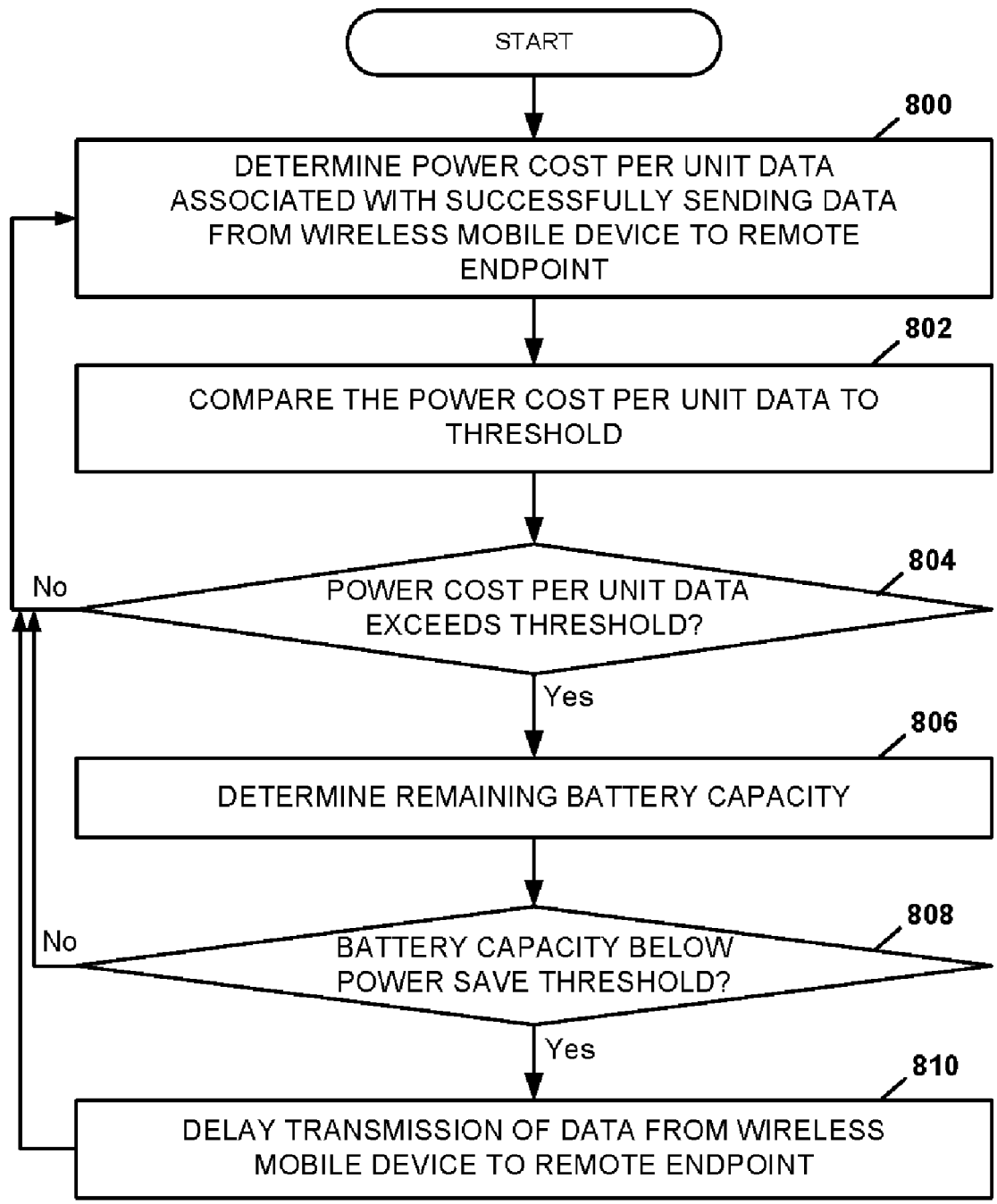
FIG. 8 is a flow diagram illustrating a method for controlling data transmission based on power cost according to another aspect of the subject matter disclosed herein.

FIG. 8 is a flow diagram illustrating a method for controlling data transmission based on power cost according to another aspect of the subject matter disclosed herein. In block 800, a power cost per unit data associated with successfully sending data from wireless mobile device 100 to remote endpoint 302 is determined by power cost monitor 300. The power cost per unit data is compared to a threshold by processor 308 in block 802. Processor 308 determines whether the power cost per unit data exceeds the threshold in block 804. When processor 308 determines that the power cost per unit data does not exceed the threshold in block 804, control returns to block 800. In block 806, the remaining battery capacity for wireless mobile device 100 is determined by processor 308 from battery capacity monitor 324. In block 808, processor 308 determines whether the battery capacity is below a power save threshold. In response to determining that the battery capacity is below the power save threshold in block 808, transmitter controller 314 delays transmission of data to remote endpoint 302 in block 810. When processor 308 determines that the battery capacity is not below the power save threshold in block 808, control returns to block 800.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for controlling data transmission based on power cost, the method comprising:
   determining a power cost per unit data associated with successfully sending data from a wireless mobile device to a remote endpoint in a communications network;
   comparing the power cost per unit data to a first threshold; and
   delaying transmission of data from the wireless mobile device to the remote endpoint based on a determination that the power cost per unit data exceeds the first threshold, wherein delaying transmission of data from the wireless mobile device to the remote endpoint includes pausing data transmission and restarting data transmission at a later time.

2. The method of claim 1 wherein determining a power cost per unit data associated with successful communications between a wireless mobile device and a remote endpoint in the communications network comprises:
   determining a data transmission rate associated with successfully sending data from the wireless mobile device to the remote endpoint;
   determining a power consumption rate associated with data transmission, wherein the power consumption rate determination takes any unsuccessful data transmissions into account; and
   determining the power cost per unit data based on the determined data transmission rate and determined power consumption rate.

3. The method of claim 2 wherein determining a data transmission rate associated with successfully sending data from the wireless mobile device to the remote endpoint includes determining at least one of a data throughput, a bit error rate (BER), a number of retries, a number of dropped packets, and a number of collisions.

4. The method of claim 2 wherein determining a power consumption rate associated with data transmission includes determining a received signal strength indicator (RSSI).

5. The method of claim 2 wherein determining a power consumption rate associated with data transmission includes measuring a power consumption rate associated with data transmission, wherein the measured power consumption rate includes power consumption resulting from any unsuccessful data transmissions.

6. The method of claim 2 wherein determining the power cost per unit data based on the determined data transmission rate and determined power consumption rate includes dividing the determined power consumption rate by the determined data transmission rate.

7. The method of claim 1 wherein comparing the power cost per unit data to a first threshold comprises:
   retrieving the first threshold from a memory of the wireless mobile device; and
   comparing the power cost per unit data to the retrieved first threshold.

8. The method of claim 7 wherein retrieving the first threshold from a memory of the wireless mobile device includes performing a lookup in a lookup table stored in the memory of the wireless device.

9. The method of claim 1 wherein delaying transmission of data from the wireless mobile device to the remote endpoint includes delaying transmission of only non-real-time data.

10. The method of claim 1 comprising:
    determining a data transmission policy based on at least one data transmission-related characteristic; and
    determining the first threshold based on the data transmission policy.

11. The method of claim 10 wherein determining a data transmission policy based on at least one data transmission-related characteristic includes determining the data transmission policy based on at least one of a type of data being transmitted, a priority associated with the type of data being transmitted, a priority assigned to data transmission by a user, a communication network type, a type of transmission, a data size being transmitted, a type of application requesting the transmission, a destination of the data transmission, a time of day, a location of the wireless mobile device, previous data transmissions, and remaining battery capacity.

12. The method of claim 10 comprising dynamically updating the first threshold according to the data transmission policy.

13. A method for controlling data transmission based on power cost, the method comprising:
   determining a power cost per unit data associated with successfully sending data from a wireless mobile device to a remote endpoint in a communications network;
   comparing the power cost per unit data to a first threshold;
   delaying transmission of data from the wireless mobile device to the remote endpoint based on a determination that the power cost per unit data exceeds the first threshold; and
   responsive to not delaying transmission of data:
      determining a new power cost per unit data associated with data transmission;
      comparing the new power cost per unit data to a second threshold; and
      stopping transmission of data from the wireless mobile device to the remote endpoint based on a determination that the new power cost per unit data exceeds the second threshold.

14. The method of claim 13 wherein the first and second threshold are equal.

15. A method for controlling data transmission based on power cost, the method comprising:
   determining a power cost per unit data associated with successfully sending data from a wireless mobile device to a remote endpoint in a communications network;
   comparing the power cost per unit data to a first threshold;
   delaying transmission of data from the wireless mobile device to the remote endpoint based on a determination that the power cost per unit data exceeds the first threshold; and
   comparing the power cost per unit data to a plurality of thresholds, each threshold corresponding to a transmission duty cycle;
   determining, based on the comparison, one of the plurality of thresholds that corresponds to the power cost per unit data and a transmission duty cycle corresponding to the determined one of the plurality of thresholds; and
   transmitting data from the wireless mobile device based on the corresponding transmission duty cycle.

16. A method for controlling data transmission based on power cost, the method comprising:
   determining a power cost per unit data associated with successfully sending data from a wireless mobile device to a remote endpoint in a communications network;
   comparing the power cost per unit data to a first threshold;
   determining a remaining battery capacity for the wireless mobile device; and
   delaying transmission of data from the wireless mobile device to the remote endpoint based on a determination that the power cost per unit data exceeds the first threshold and based on the remaining battery capacity, wherein delaying transmission of data from the wireless mobile device to the remote endpoint includes pausing data transmission and restarting data transmission at a later time.

17. A computer program product comprising computer executable instructions embodied in a computer-readable medium for performing steps comprising:
   determining a power cost per unit data associated with successfully sending data from a wireless mobile device to a remote endpoint in a communications network;
   comparing the power cost per unit data to a first threshold; and
   delaying transmission of data from the wireless mobile device to the remote endpoint based on a determination that the power cost per unit data exceeds the first threshold, wherein delaying transmission of data from the wireless mobile device to the remote endpoint includes pausing data transmission and restarting data transmission at a later time.

18. A system for controlling data transmission based on power cost, the system comprising:
   means for determining a power cost per unit data associated with successfully sending data from a wireless mobile device to a remote endpoint in a communications network;
   means for comparing the power cost per unit data to a first threshold; and
   means for delaying transmission of data from the wireless mobile device to the remote endpoint based on a determination that the power cost per unit data exceeds the first threshold, wherein delaying transmission of data from the wireless mobile device to the remote endpoint includes pausing data transmission and restarting data transmission at a later time.

19. A system for controlling data transmission based on power cost, the system comprising:
   a power cost monitor that determines a power cost per unit data associated with successfully sending data from a wireless mobile device to a remote endpoint in a communications network and that compares the power cost per unit data to a first threshold and
   a transmitter controller that delays transmission of data from the wireless mobile device to the remote endpoint based on a determination that the power cost per unit data exceeds the first threshold, wherein the transmitter controller is configured to delay transmission of data from the wireless mobile device to the remote endpoint by pausing data transmission and restarting data transmission at a later time.

20. The system of claim 19 wherein the power cost monitor comprises:
   a data rate monitor that determines a data transmission rate associated with successfully sending data from the wireless mobile device to the remote endpoint;
   a power consumption rate monitor that determines a power consumption rate associated with data transmission, wherein the power consumption rate determination takes any unsuccessful data transmissions into account; and
   a processor that determines the power cost per unit data based on the determined data transmission rate and determined power consumption rate and compares the power cost per unit data to the first threshold.

21. The system of claim 20 wherein the data rate monitor is configured to determine a data transmission rate associated with successfully sending data from the wireless mobile device to the remote endpoint by determining at least one of a data throughput, a bit error rate (BER), a number of dropped packets, a number of retries, and a number of collisions.

22. The system of claim 20 wherein the power consumption rate monitor is configured to determine a power consumption rate associated with data transmission by determining a received signal strength indicator (RSSI).

23. The system of claim 20 wherein the power consumption rate monitor is configured to determine a power consumption rate associated with data transmission by measuring a power consumption rate associated with data transmission, wherein the measured power consumption rate includes power consumption resulting from any unsuccessful data transmissions.

24. The system of claim 20 wherein the processor is configured to determine the power cost per unit data based on the determined data transmission rate and determined power consumption rate by dividing the determined power consumption rate by the determined data transmission rate.

25. The system of claim 20 comprising a memory, wherein the processor is configured to compare the power cost per unit data to a first threshold by:
retrieving the first threshold from the memory; and
comparing the power cost per unit data to the retrieved first threshold.

26. The system of claim 25 wherein the processor is configured to retrieve the first threshold from the memory by performing a lookup in a lookup table stored in the memory.

27. The system of claim 19 wherein the transmitter controller is configured to delay transmission of data from the wireless mobile device to the remote endpoint by delaying transmission of only non-real-time data.

28. The system of claim 20 wherein the processor is configured to:
determine a data transmission policy based on at least one data transmission-related characteristic; and
determine the first threshold based on the data transmission policy.

29. The system of claim 28 wherein the processor is configured to determine a data transmission policy based on at least one data transmission-related characteristic by determining the data transmission policy based on at least one of a type of data being transmitted, a priority associated with the type of data being transmitted, a priority assigned to data transmission by a user, a communication network type, a type of transmission, a data size being transmitted, a type of application requesting the transmission, a destination of the data transmission, a time of day, a location of the wireless mobile device, previous data transmissions, and remaining battery capacity.

30. The system of claim 28 wherein the processor is configured to determine the first threshold based on the data transmission policy by dynamically updating the first threshold according to the data transmission policy.

31. A system for controlling data transmission based on power cost, the system comprising:
a power cost monitor that determines a power cost per unit data associated with successfully sending data from a wireless mobile device to a remote endpoint in a communications network and that compares the power cost per unit data to a first threshold, wherein the power cost monitor comprises a data rate monitor that determines a data transmission rate associated with successfully sending data from the wireless mobile device to the remote endpoint, a power consumption rate monitor that determines a power consumption rate associated with data transmission, wherein the power consumption rate determination takes any unsuccessful data transmissions into account, and a processor that determines the power cost per unit data based on the determined data transmission rate and determined power consumption rate and compares the power cost per unit data to the first threshold; and
a transmitter controller that delays transmission of data from the wireless mobile device to the remote endpoint based on a determination that the power cost per unit data exceeds the first threshold,
wherein the processor is configured to, responsive to the transmitter controller not delaying transmission of data, determine a new power cost per unit data associated with data transmission and compare the new power cost per unit data to a second threshold, and the transmitter controller is configured to stop transmission of data from the wireless mobile device to the remote endpoint based on a determination by the processor that the power cost per unit data exceeds the second threshold.

32. The system of claim 31 wherein the first and second thresholds are equal.

33. A system for controlling data transmission based on power cost, the system comprising:
a power cost monitor that determines a power cost per unit data associated with successfully sending data from a wireless mobile device to a remote endpoint in a communications network and that compares the power cost per unit data to a first threshold, wherein the power cost monitor comprises a data rate monitor that determines a data transmission rate associated with successfully sending data from the wireless mobile device to the remote endpoint, a power consumption rate monitor that determines a power consumption rate associated with data transmission, wherein the power consumption rate determination takes any unsuccessful data transmissions into account, and a processor that determines the power cost per unit data based on the determined data transmission rate and determined power consumption rate and compares the power cost per unit data to the first threshold; and
a transmitter controller that delays transmission of data from the wireless mobile device to the remote endpoint based on a determination that the power cost per unit data exceeds the first threshold,
wherein the processor is configured to:
compare the power cost per unit data to a plurality of thresholds, each threshold corresponding to a transmission duty cycle;
determine, based on the comparison, one of the plurality of thresholds that corresponds to the power cost per unit data and a transmission duty cycle corresponding to the determined one of the plurality of thresholds; and
transmit data from the wireless mobile device based on the corresponding transmission duty cycle.

34. A system for controlling data transmission based on power cost, the system comprising:
a power cost monitor that determines a power cost per unit data associated with successfully sending data from a wireless mobile device to a remote endpoint in a communications network, that compares the power cost per unit data to a first threshold, and that determines a remaining battery capacity for the wireless mobile device; and a transmitter controller that delays transmission of data from the wireless mobile device to the remote endpoint based on a determination that the power cost per unit data exceeds the first threshold and based on the remaining battery capacity, wherein the transmitter controller is configured to delay transmission of data from the wireless mobile device to the remote endpoint by pausing data transmission and restarting data transmission at a later time.

* * * * *